United States Patent
Lea (10) Patent No.: US 9,036,482 B2
(45) Date of Patent: May 19, 2015

(54) BUFFERLESS NONBLOCKING NETWORKS ON CHIP

(71) Applicant: The Hong Kong University of Science and Technology, Hong Kong (CN)

(72) Inventor: Chin Tau Lea, Hong Kong (CN)

(73) Assignee: The Hong Kong University of Science and Technology, Kowloon (HK)

( * ) Notice: Subject to any disclaimer, the term of this patent is extended or adjusted under 35 U.S.C. 154(b) by 150 days.

(21) Appl. No.: 13/708,390

(22) Filed: Dec. 7, 2012

(65) Prior Publication Data
US 2013/0148506 A1     Jun. 13, 2013

Related U.S. Application Data (60) Provisional application No. 61/630,277, filed on Dec. 8, 2011.

(51) Int. Cl.
| | |
|---|---|
| *H04L 12/26* | (2006.01) |
| *H04L 12/56* | (2006.01) |
| *H04B 10/00* | (2013.01) |
| *H04J 14/02* | (2006.01) |
| *H04L 12/823* | (2013.01) |
| *H04L 12/933* | (2013.01) |
| *H04L 12/947* | (2013.01) |

(52) U.S. Cl.
CPC .............. *H04L 47/32* (2013.01); *H04L 49/101* (2013.01); *H04L 49/109* (2013.01); *H04L 49/25* (2013.01)

(58) Field of Classification Search
CPC ...................................................... H04L 47/10
USPC .............................. 370/236, 389; 398/115, 79
See application file for complete search history.

(56) References Cited

U.S. PATENT DOCUMENTS

| | | | |
|---|---|---|---|
| 7,656,886 B2 | 2/2010 | Lea et al. | |
| 2010/0158528 A1* | 6/2010 | Resende et al. | 398/79 |
| 2010/0202449 A1* | 8/2010 | Moscibroda et al. | 370/389 |
| 2011/0103799 A1* | 5/2011 | Shacham et al. | 398/115 |

OTHER PUBLICATIONS

Liu, et al., "A Methodology for Design of Unbuffered Router Microarchitecture for S-Mesh NoC", Copyright IFIP International Federation for Information Processing 2010, 10 pages.
Nychis, et al., "Next Generation On-Chip Networks: What Kind of Congestion Control Do We Need?", Copyright 2010 ACM 978-1-4503-0409-Feb. 10, 2010, 6 pages.
Rattner, "Multi-core goes mainstream, Computing pushed to extremes", Intel Developer Forum, San Francisco, Sep. 15, 2011, 3 pages.

(Continued)

*Primary Examiner* — Kiet G Tang
(74) *Attorney, Agent, or Firm* — Amin, Turocy & Watson, LLP (57) ABSTRACT

Network on Chips (NoC)s with a bufferless and nonblocking architecture are described. Core processors are communicatively coupled together on a substrate with a set of routing nodes based on nonblocking process. A network component routes data packets through the routing nodes and the core processors via communication links. A bufferless cross bar switch facilitates the communication of the data packets and/or path setup packets through the communication links among source processors and destination processors. The communication links include one or more channels, in which a channel comprises a data sub-channel, an acknowledgement sub-channel and a release sub-channel.

20 Claims, 9 Drawing Sheets

(56) References Cited

OTHER PUBLICATIONS

Horowitz et al., "Scaling, power, and the future of CMOS". In IEEE Intl. Electron Devices Meeting, Dec. 2005, 7 pages.

Dally et al., "Route packets, not wires: On-chip interconnection networks", In Proceedings of the 38thConference on Design Automation 2001, ACM, New York, 6 pages.

Bjerregaard et al., "A survey of research and practices of network-on-chip", ACM Computing Surveys (CSUR) 38, 1. 2006, 51 pages.

Chu et al., "New architecture and algorithms for fast construction of hose-model VPNs," IEEE Trans. on Networking, Jun. 2008, pp. 670-679.

Glass et al., "The turn model for adaptive routing," Journal of the ACM, 41:874-902, Sep. 1994, 10 pages.

Chiu, "The odd-even turn model for adaptive routing," IEEE Trans. on Parallel and Distributed systems, 11:729-738, Jul. 2000, 10 pages.

Li et al., "DyXY—a proximity congestion-aware deadlock-free dynamic routing method for network on chip," In Proc. of Design Automation Conference, pp. 849-852, 2006, 4 pages.

Hoskote et al. "A 5-ghz mesh interconnect for a teraflops processor," IEEE Micro, 2007, 11 pages.

Bolotin et al., "Cost considerations in network on chip", Integration, The VLSI journal 38 (2004) pp. 19-42, 24 pages.

Azar et al., "Optimal oblivious routing in polynomial time", In ACM STOC, 2003, 6 pages.

\* cited by examiner

BUFFERLESS NONBLOCKING NETWORKS ON CHIP

CROSS REFERENCE TO RELATED APPLICATIONS

This application claims priority to U.S. provisional patent application No. 61/630,277, entitled: "BUFFERLESS NONBLOCKING NETWORKS ON CHIP," and filed on Dec. 8, 2011, which is hereby incorporated by reference in its entirety.

TECHNICAL FIELD

The present disclosure is related to communication networks used inside a chip to interconnect network processor cores, e.g., network on chip (NoC) design(s) that are bufferless and nonblocking.

BACKGROUND

Performance gains of a processor will come from the increase in the number of processor cores per chip, which is evidenced by recent announcements and reflections in the commercial space that multi-core has gone mainstream. A network-on-chip (NoC) for providing communication among the multiple cores enables increasing performance for such a processor.

The main challenge of the NoC design lies in how to meet, in a power efficient way, the bandwidth demand and the stringent latency requirement of a wide range of applications. Many topologies have been proposed for NoC. Most proposed NoCs use a buffered approach where packets are broken into small pieces, called flits (flow control digits). The first flit holds the packet's destination address and sets up the path hop-by-hop for all subsequent flits (belonging to the same packet) to follow. If the head flit is blocked, the entire packet will stop moving and be buffered inside the NoC.

Figure 1:
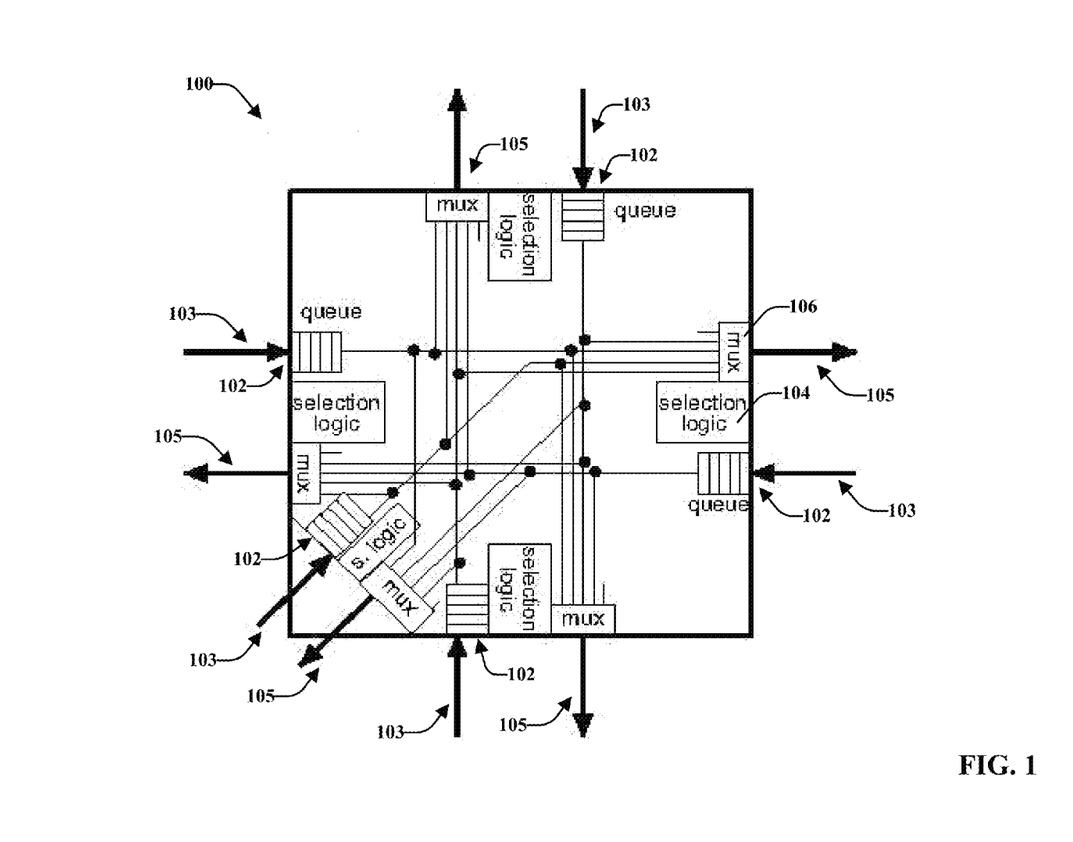
FIG. 1 is an example buffered node design in accordance with prior art.

FIG. 1 illustrates a typical buffered node 100 that comprises inputs 103 that include a queue or buffers 102 to buffer data packets received. Each output 105 has an arbitrator or selection logic unit 105 coupled with a multiplexer 106 to decide which input queue 102 will be selected for using the particular output link that the arbitrator is associated with among the plurality of output links.

Since buffers can potentially cause deadlocks, various routing algorithms have been proposed to prevent this from occurring in a buffered NoC. For example, static XY routing algorithm is proposed for 2-dimensional mesh networks, in which packets are routed first along x-direction and then y-direction. This algorithm is deadlock-free, but cannot avoid congestion. In another example, a partially adaptive routing called the turn-model is introduced. In yet another example, the odd-even turn scheme was proposed, which restricts the positions at which turns are allowed to avoid deadlocks. Further, some have introduced adaptive routing into NoCs. Congestion flags are exchanged between neighbor routers. If a router's neighbors are not congested, then it operates on a deterministic mode; otherwise, the adaptive mode is used. In spite of its complexity, this adaptive routing algorithm cannot totally avoid congestion. It only tries to deal with congestions after they are formed, and these routing schemes are operate for buffered networks.

The above discussion shows that conventional buffered NoCs have deficiencies in their approach. For instance, with conventional approaches, to prevent deadlocks, complicated routing algorithms are used adding much to overhead. Furthermore, buffers are expensive in terms of power consumption (both dynamic and static energy), silicon area, and complexity. The above-described background is merely intended to provide an overview of contextual information regarding conventional buffered NoCs, and is not intended to be exhaustive. Additional context may become apparent upon review of one or more of the various non-limiting embodiments of the following detailed description.

SUMMARY

The following presents a simplified summary of the specification in order to provide a basic understanding of some aspects of the specification. This summary is not an extensive overview of the specification. It is intended to neither identify key or critical elements of the specification nor delineate any scope of particular embodiments of the specification, or any scope of the claims. Its sole purpose is to present some concepts of the specification in a simplified form as a prelude to the more detailed description that is presented later.

Various embodiments for a bufferless nonblocking Network on Chips (NoC)s are disclosed, in which the NoCs have no buffers inside and/or integrated on the chip. For example, the chips are considered nonblocking by design so that the processors integrated on the substrate or chip can always establish a communication connection and transmit a data packet if any one of the processors is in an idle state. Consequently, adversarial traffic patterns do not degrade the performance of the NoC. No deflection routing, and no sophisticated congestion controls or routing arbitration schemes are implemented within the architecture.

An exemplary system comprises core processers that are communicatively coupled together at a substrate via routing nodes based on a set of nonblocking processes. A network component is configured to route data packets through the routing nodes and the core processors via communication links. A bufferless crossbar switch is configured to facilitate communication of the data packets through the communication links. A set of channels are included in a communication link of the communication links. The set of channels include a data sub-channel configured to communicate the data packets, an acknowledgement sub-channel configured to communicate an acknowledgement message, and a release sub-channel configured to communicate a release message.

In another non-limiting embodiment, an example method comprises communicatively coupling core processors on a substrate with routing nodes via a set of communication links based on a set of nonblocking processes that determine a set of discrete number of channels in a communication link for the set of communication links, wherein the discrete number is an integer. Data packets are routed with a bufferless crossbar switch among the routing nodes and the core processors via the communication links.

In yet another non-limiting embodiment, another example method comprises integrating core processors on a substrate with a communication network that comprises a topology architecture of routing nodes. The core processors are coupled on the substrate via communication links that each have a discrete number of channels based on a linear function of routing node capacities and a set of nonblocking process specifications. Data packets are communicated along a bufferless communication pathway from a source core processor to a destination core process via the routing nodes.

The following description and the drawings set forth certain illustrative aspects of the specification. These aspects are indicative, however, of but a few of the various ways in which the various embodiments of the specification may be employed. Other aspects of the specification will become apparent from the following detailed description of the specification when considered in conjunction with the drawings.

BRIEF DESCRIPTION OF THE DRAWINGS

Numerous aspects and embodiments are set forth in the following detailed description, taken in conjunction with the accompanying drawings, in which like reference characters refer to like parts throughout, and in which.

DETAILED DESCRIPTION

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that the certain aspects of disclosure may be practiced without these specific details, or with other methods, components, molecules, etc. In other instances, well-known structures and devices are shown in block diagram form to facilitate description and illustration of the various embodiments.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Overview

Network on Chips (NoCs) can include integrated processors on a chip or substrate with communication subsystems or components that utilize networking theories to operate the communications between the integrated processors. In a NoC system, components such as processor cores, memories and specialized IP blocks exchange data using a network as a communication transport sub-system for the information traffic. A NoC is constructed from multiple point-to-point data links interconnected by switches (routers), or, in other words, routing nodes within a network configuration or architecture topology. The routing nodes enable messages to be relayed from any source module (source processor/node) to any destination module (destination processor/node) over one or more communication links, such as by typically making routing decisions at the switches. In one embodiment of the present disclosure, the communication pathways are pre-determined and no decision is made during the communication transmissions. A bufferless (without buffers) implementation at the chip allows for the entire communication pathway to be established before data transmission initiates.

A NoC can be thought as similar to a modern telecommunications network, using digital bit-packet switching over multiplexed and/or various links. A NoC system can include resource nodes, router nodes, links, a network interface unit, and/or routing algorithms for meeting the requirements of the different architectures. Removing buffers from the chip substrate and the networking components that facilitate communication among the core processors can reduce power consumption by 20%~40%, and further reduce the silicon area by 70% for NoCs. Therefore, methods for designing bufferless NoCs can provide valuable real estate to the chip. Some proposed solutions, such as deflecting routing was proposed to remove buffers from a NoC, in which a flit is blocked during transmission and the router sends it to an available output port. However, this alone can degrade routing efficiency, and as traffic load increases, the throughput of the network may drop. To prevent the degradation of output efficiency from happening, sophisticated congestion control and routing arbitration controls have been proposed, which can be implemented in a bufferless environment. However, the present disclosure provides for bufferless, nonblocking NoC without sophisticated congestion control or routing arbitration schemes. For example, a design for routing nodes on a bufferless nonblocking network on a chip is proposed. Additionally, processes for determining a number of channels for each link between nodes and/or processor cores are provided to make the network on a chip nonblocking, and applicable to any topology architecture.

Bufferless Nonblocking Networks on Chip

Figure 2A:
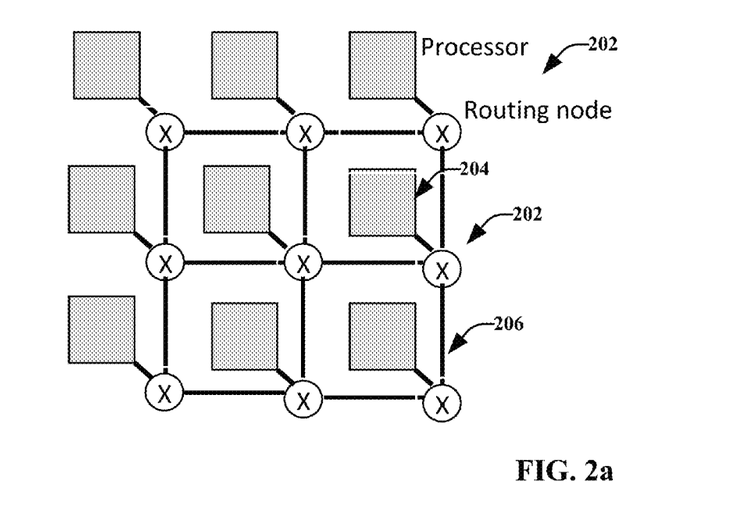
FIGS. 2a-2d illustrate example non-limiting NoC topologies in accordance with embodiments described.
Figure 2B:
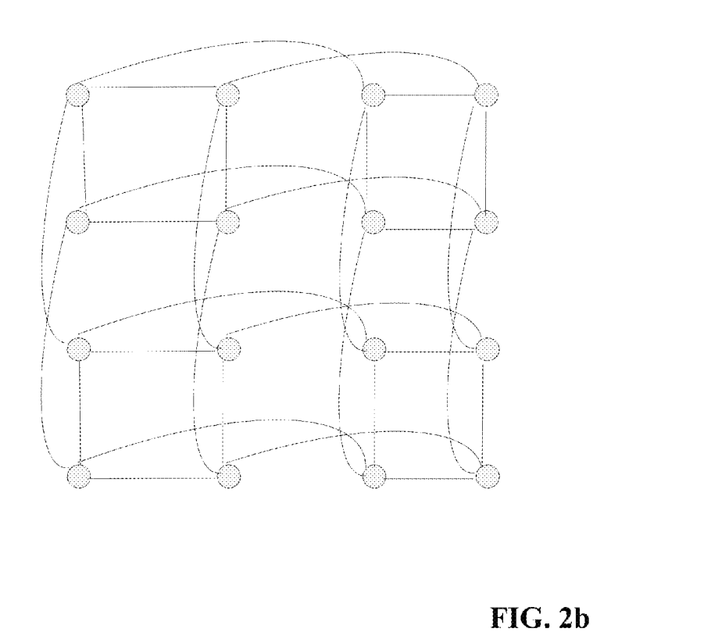
Figure 2C:
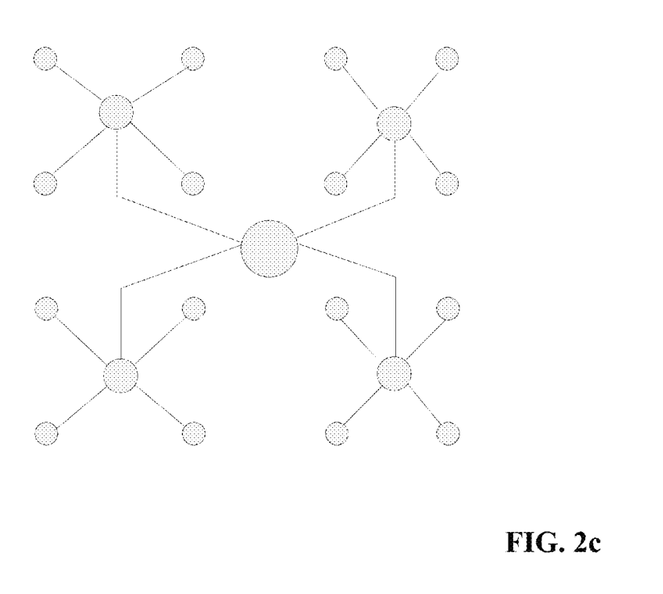
Figure 2D:
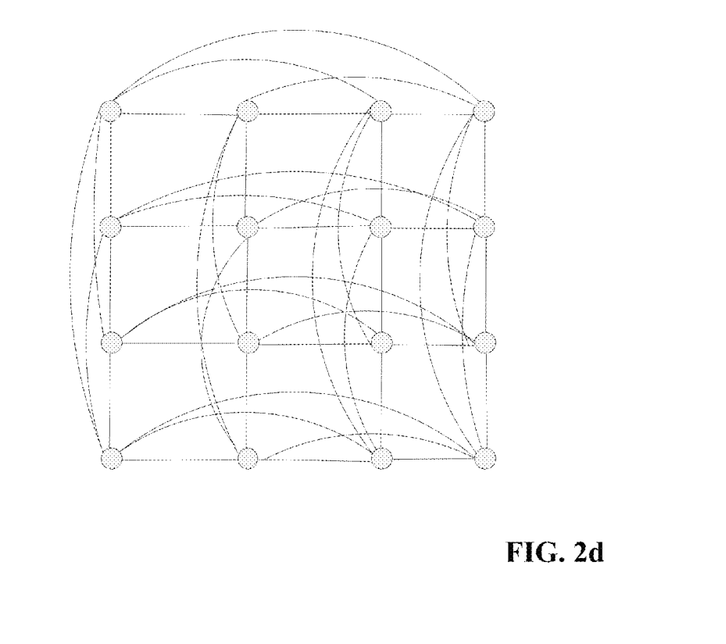
Figure 3:
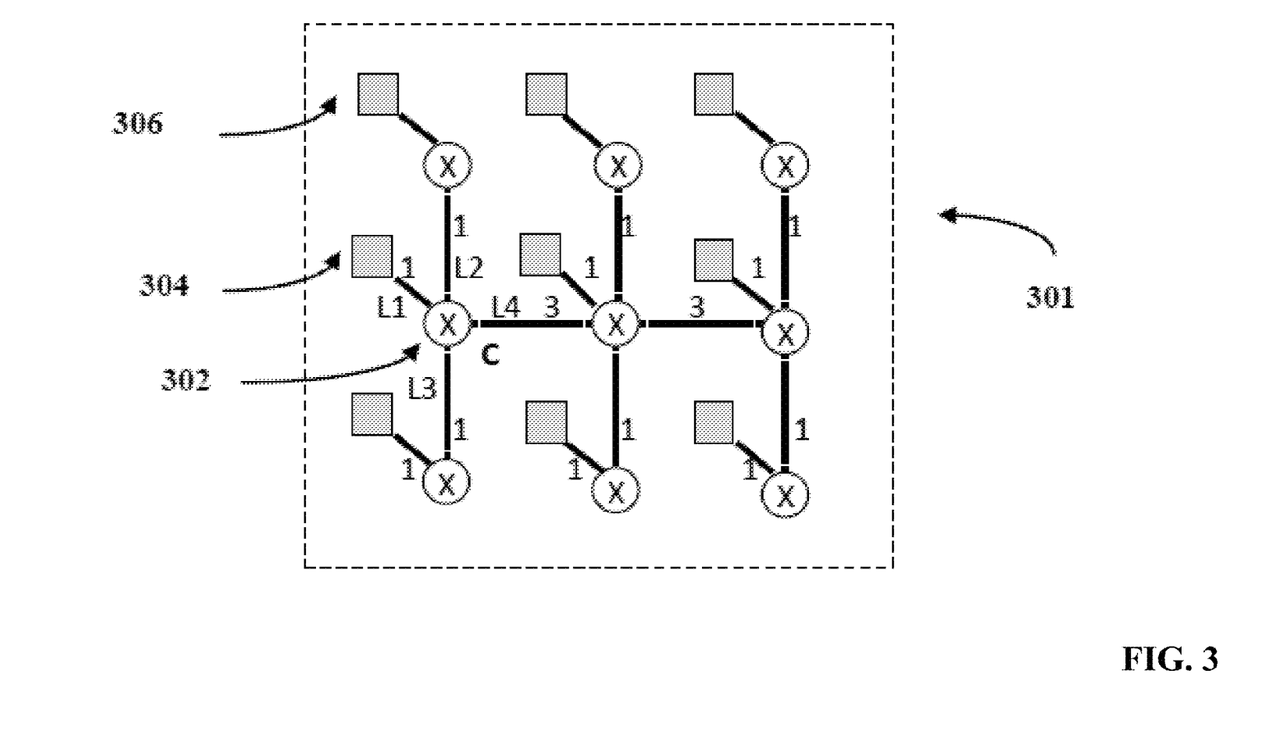
FIG. 3 illustrates an example non-limiting topology and space channel design for communication links in accordance with nonblocking process embodiments described.

Referring to FIGS. 2a-2d, illustrated are bufferless nonblocking architectures of various topologies in accordance with various embodiments disclosed. For example, FIG. 2a-2d illustrates a mesh topology, a Folded Torus Topology, a Fat Free Topology and a Flattened Butterfly Topology respectively. Although various topology architectures for NoCs herein are illustrated, the proposed embodiments can enable construction of nonblocking NoCs with any topology. Each link in the network comprises a discrete number of channels in both directions. When we consider a node, the two directions of an attached link can be named as the incoming direction (coming to the node) and outgoing direction (departing from the node). The method described later will show how to calculate the number of discrete channels required for each link, in both directions, to make the network nonblocking in the sense that if the destination node is available, a source node can always establish the connection to that destination node. One example of the derived link capacities for the mesh topology in FIG. 2a is shown in FIG. 3 where the numbers of discrete channels of all links are shown. In this example, the link capacities of both directions happen to be the same. For node 302, its four attached links are L1, L2, L3, and L4. The numbers of discrete channels of L1, L2, L3, and L4 are 1, 1, 1, and 3 (in both directions) respectively. Note that the numbers of channels in both directions of a link do not need to be the same.

Figure 4:
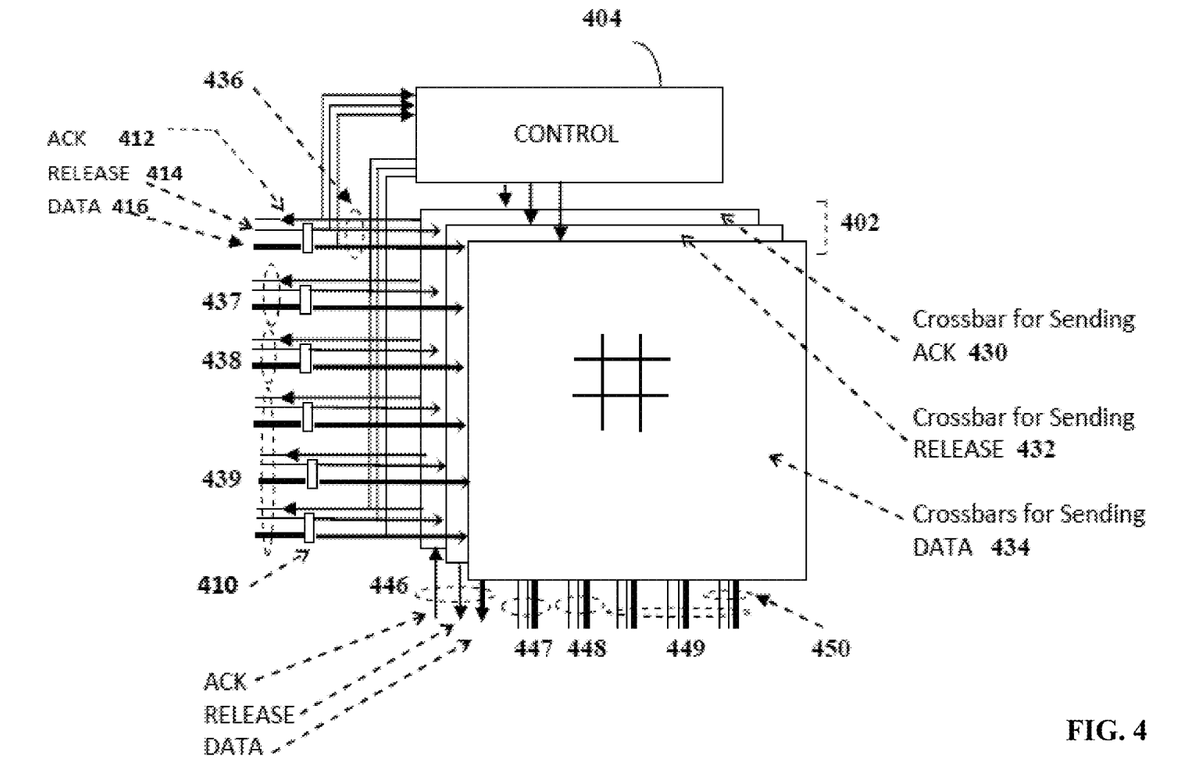
FIG. 4 illustrates an example non-limiting node design structure according to embodiments described.

In the network infrastructure of a NoC 301. Routing node 302 is coupled to processor(s) 304, 306, for example, and communicates data packets with other nodes along a predetermined communication pathway. FIG. 4 illustrates a node structure of the routing node 302 as an example in accordance with various embodiments described. Node 302 includes various communication links: Link 436 and 446 are the incoming (coming to the node) and outgoing (departing from the node) link of L1; Link 437 and 447 are the incoming and outgoing links of L2; Link 438 and 439 are the incoming and the outgoing link of L3; Link 439 and 449 are the incoming and outgoing link of L4. Link 449 has three channels and one channel 450 is also shown in FIG. 4.

An incoming link 436 connected to the node 302, for example, has one discrete channel, and the channel has three sub-channels 412, 414, 416 for the incoming direction and similar sub-channels also exist in communication link 446 of the corresponding outgoing direction. Sub-channel 416 is for sending data or data packets, and sub-channels 414 and 416 are for sending control signals (an acknowledgement sub-channel 412 and a release sub-channel 414). In one example, a data packet can operate as a setup packet, in which a head flit of the entire packet comprises the destination address. The acknowledgement sub-channel 412 is configured to communicate acknowledgement messages from the node 302 and to a processor and/or other node for routing (to a destination processor/address). The release sub-channel 414 is configured to communicate a RELEASE message from the routing node 302.

In one embodiment, the direction of communication of each release sub-channel 414 and data sub-channel 416 is an opposite direction with respect to the direction of communication of the acknowledgement sub-channel 412 of the one discrete channel of the communication link 436. The sub-channels in the channels of communication links can thus be uni-directional channels. For example, the release sub-channel 414 and the data sub-channel 416 include a direction of communication flow into the routing node 302, while the acknowledgement sub-channel 412 can have a direction of communication flow out of the routing node 302, and/or vice versa.

In another embodiment, a width of the acknowledgement sub-channel 412 and release sub-channels can be only one bit. The width of a data sub-channel can be large in comparison, such as 32 bits, 64 bits, etc., for example. In one example, the acknowledgement sub-channels can be configured as a wire and have no flip flops inserted in between the communication line, while its transmission direction can be in an opposite direction of the data and the release sub-channels for each channel of each communication link at the routing node 302.

The routing node 302 is bufferless and so does not comprise buffers that hold data packets. The routing node 302 comprises one or more bufferless crossbar switches 402 and a control logic as a network component or a control unit 404. The bufferless crossbar switch 402 can include, for example, one crossbar unit 430 for communicating ACK signals, one crossbar unit 432 for communicating RELEASE control signals, and multiple crossbar units 434 for communication of DATA or data messages. Each crossbar unit, for example, can comprise an assembly of switches, (e.g., flip-flops or the like) such as switching component 410, arranged in a matrix having M inputs and N outputs with M×N cross-points where cross bars or switches are located. When closed one of the M inputs, for example, connects to one of the N outputs.

Figure 5:
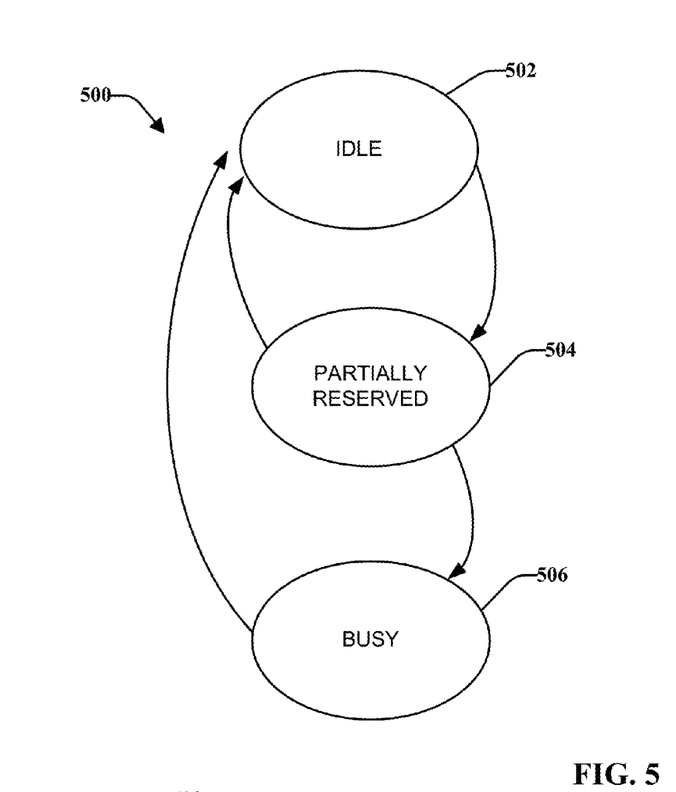
FIG. 5 illustrates an example non-limiting state diagram according embodiments described.

Each routing node 302 can comprise the control logic 404 that monitors, controls and/or communicates a state of the DATA sub-channels of the outgoing links 446, 447, 448, 449, for example. Additionally, the state of incoming communication links 436, 437, 438, 439 can be monitored by upstream routing nodes of that link. For example, referring to FIG. 5 illustrates a state diagram 500 that illustrates at least three states that are monitored for the DATA sub-channel of link 446. At 502, an idle state represents that the DATA sub-channel of 446 is available for communication. At 504, a partially reserved state indicates that the first slit of a data packet has travel through the node and requested that DATA sub-channel successfully. If ACK comes back within a preset interval, the DATA sub-channel enters the busy state. Otherwise, the DATA sub-channel will be reset to idle state.

Figure 6:
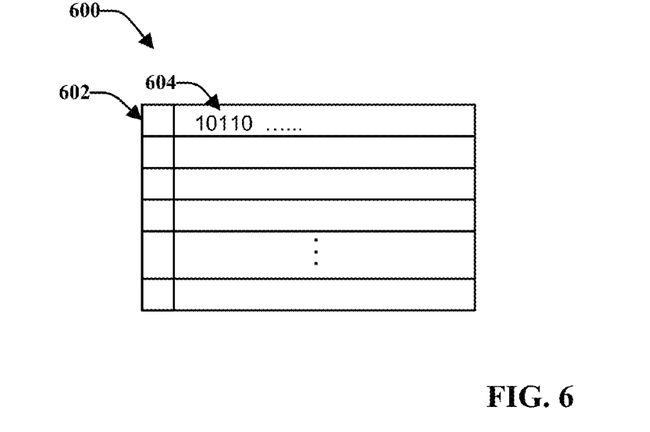
FIG. 6 illustrates an example non-limiting packet format according to embodiments described.

Referring now to FIG. 6, illustrated is an example of a packet 600 that can comprise multiple flits 604. A first bit 602 of each flit is used to indicate if the flit is valid (=1) or idle (=0). When a processor has a packet ready for transmission, it immediately transmits the packet to the destination node/processor component. Routing is fixed and the specification of the entire path is carried in the head flit 604 of a packet (e.g., explicit routing). In the case of an n×n mesh-based NoC, for example, the average number of nodes a packet passes through is n. Also, it can take only two bits to specify which outgoing link of a node to use. The average overhead of the communication path or networking scheme can be 2n bits (e.g. 12 bits for a mesh network with 36 processors). Compared to a packet transmission time (assumed to be between 128 and 1024 flits), this overhead is small.

In each flit 604, there is one bit 602 for indicating a valid or an invalid (idle) flit. For example, when a head flit arrives from Link 437 and chooses outgoing link 449, the node (e.g., via the network control component 404) selects one idle channel 450 of the targeted link 449, for example, to communicate the packet. The selected channel 450, for example, is then temporarily reserved for this packet and 450's state is set to be the partially reserved state 504. Crossbar 430 is also set accordingly so that the later arrived ACK from 450 will be sent to Link 437 in the reversed direction. If the targeted communication link 449 has no channels available, the packet is dropped since nodes have no buffers to hold packets. Because the NoC is nonblocking, blocking can only happen when the destination is busy communicating with other node processors. If the head flit 604, for example, reaches a destination component (e.g., destination processor 306 and/or a node), an acknowledgement message (e.g., an ACK signal of one pulse) will be sent back by the destination processor through the acknowledgement sub-channel of the same channel (e.g., 450). Once the transmission is done, the source processor (e.g., source processor 304) can send a release message/signal (one pulse) through the release sub-channel of 450 to set the channel to an idle state 502 again.

In one embodiment, for each temporarily/partially reserved 504 channel, the acknowledgement message or ACK signal must be received within a fixed-length time-out internal or predetermined time function, according to a clock or timer component, such as at the control unit/logic 404, for example. The lack of ACK within this interval will force the control unit 404 to automatically reset the temporarily reserved channel to an idle state 502 and the crosspoint inside crossbar 430 to open so that Link 450 will be available for further data communication. The lack of ACK within a short interval indicates to the source processor that the packet is dropped. The source processor will stop the current transmission and re-send the packet at a later time.

For example, the length of the time-out interval or predetermined time function can be determined by a maximum end-to-end/communication pathway delay. In a mesh-based NoC, for example, with $n^2$ processors, the maximum end-to-end/communication pathway delay is only 2n clock cycles (e.g., having a delay of one clock cycle per node). It also takes one clock cycle, for example, to send the acknowledgement message or ACK signal (as the ACK sub-channels can be connected like a wired connection). Thus, for example, the length of the time-out interval can be approximately 2n+1 cycles for an n×n mesh NoC topology architecture. For example, in a NoC supporting 36 processor cores coupled together by a network of routing nodes, the time-out interval is about 13 cycles. This means that the communication networking of the NoC only wastes or uses 13 clock cycles for a channel temporarily reserved for a failed transmission, which can be insignificant when it is compared to regular packet lengths in NoC applications.

Figure 7:
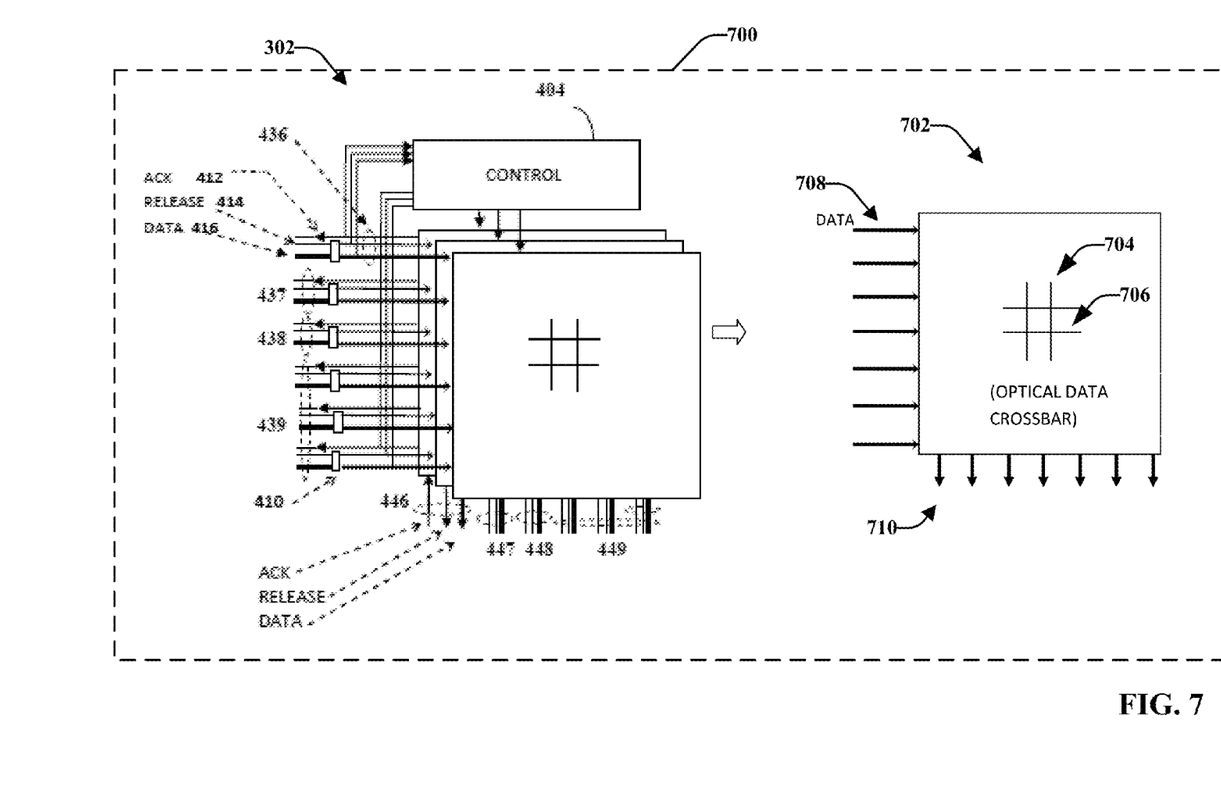
FIG. 7 illustrates an example non-limiting bufferless optical nonblocking network on chip according to embodiments described.

Referring now to FIG. 7, illustrated is an example architecture 800 of implementing the DATA sub-channels of the routing node 302 optically. The DATA sub-channel 708 comprises many crossbars. Most of the crossbars are separated from the node and only one of few or a subset of crossbars remains for sending out the path setup packet. Node 702 comprises an electronic (e.g., as in node configuration 302) and an optical DATA sub-channel configuration. In one embodiment, the routing node 702 comprises optical waveguides 708 for communication of data packets and optical data crossbars 704, for example, which can include one or more silicon photonic rings 706.

The network's control signals can be communicated through electrical pathways (e.g., sub-channels 412, 412, and/or 416) such as in 302, which can be transmitted in the same way as described above with respect to routing node 302. Each source node will generate a short path setup signal containing only the first flit 604 as illustrated in FIG. 6. During the communication path setup, the optical path, for example, can be reserved the same way as how an electronic path is reserved as described above. For example, after an acknowledgement message or ACK is received from the destination node or processor, data transmission can begin and an idle state for the link is moved to a partially reserved or busy state. The DATA sub-channels in 302 can be used to transmit connection setup packets for establishing a communication path, in which the entire path is established first, and afterwards, the data can be transmitted through optical crossbars. In one example, there are at least two processes for setting up or establishing a communication path. As discussed above in FIG. 4, a data packet can operate as a setup packet, in which the head flit of the entire packet comprises a destination address. In addition, an optical crossbar can also be utilized, in which an a path setup packet is used to setup the communication path. For example, the head flit of a data packet is separated from the data packet in the case of an optical data crossbar since the data packet is sent through separate optical crossbars. The data packet can thus become a path setup packet and is initially transmitted through an electronic data crossbar. If an ACK or acknowledgement returns, then the data packet is sent through the optical crossbar. The bufferless implementation enables the NoC 700 to establish the entire path as a predetermined communication pathway before data transmission begins, e.g. before transmitting the remaining flits of FIG. 6 through the optical crossbars. This makes the NoC 700 a path switching device that networks communications among various configurations of routing nodes and/or processor cores that operate as a System on a Chip. Furthermore, the path can be setup so fast that the implementation is efficient even for packet networks.

Example Link Capacity Nonblocking Processes

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases. Reference may be made to the figures described above for ease of description. However, the methods are not limited to any particular embodiment or example provided within this disclosure and can be applied to any of the systems disclosed herein.

Figure 8:
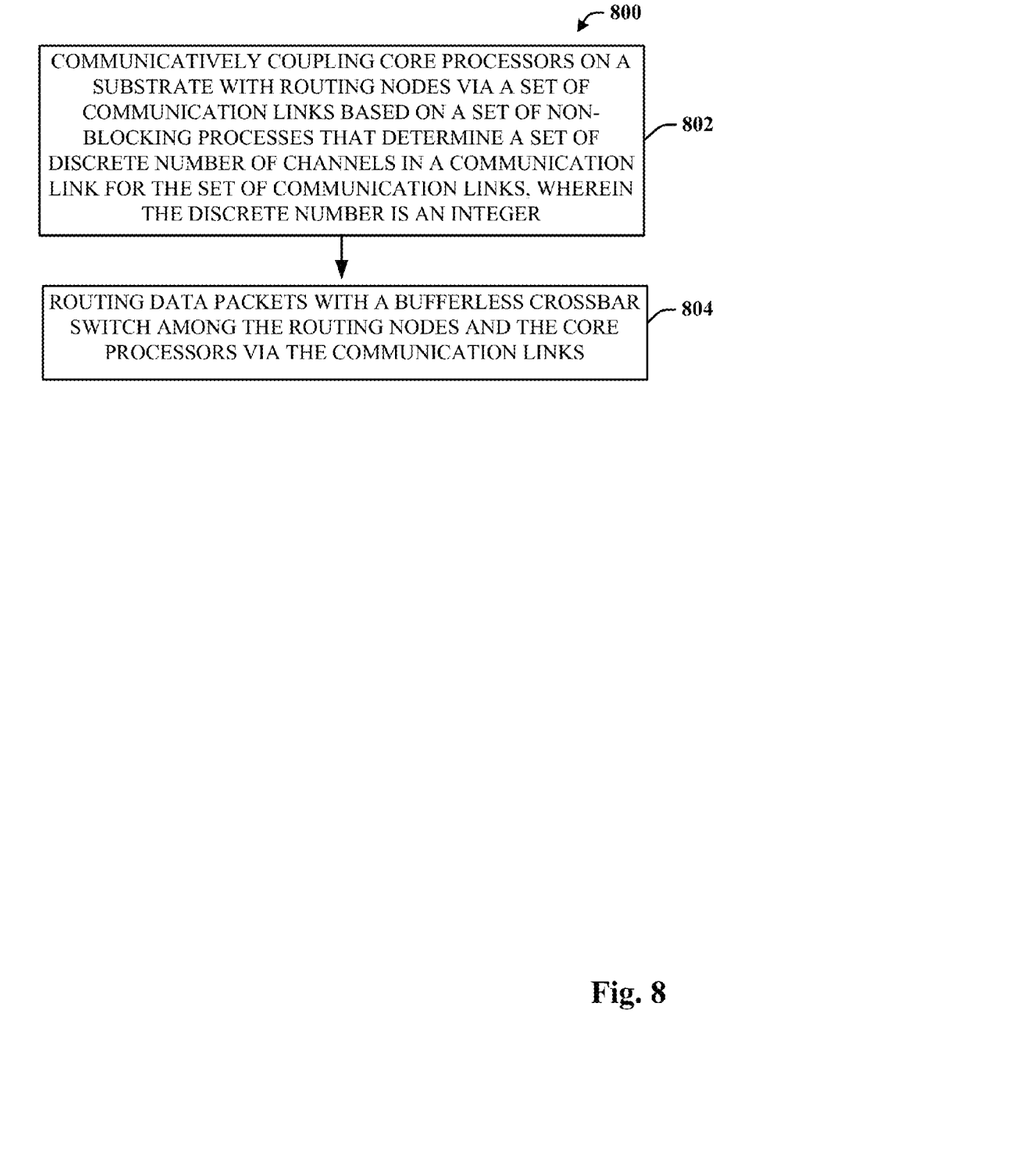
FIG. 8 illustrates an example methodology for a network on chip in accordance with certain embodiments of this disclosure.

The method 800 initiates at 802 and comprises communicatively coupling core processors on a substrate with routing nodes via a set of communication links based on a set of non-blocking processes to form an NoC. The nonblocking processes, for example, determine a set of discrete number of channels in a communication link of the set of communication links, wherein the discrete number is an integer and a set can be interpreted as "one or more."

At 804, data packets are routed with a bufferless crossbar switch among the routing nodes and the core processors via the communication links. For example, the data packets can be communicated via a data sub-channel of at least one channel of the set of discrete number of channels. An acknowledgement message can be communicated via an acknowledgement sub-channel of the at least one channel, and a release message can be communicated via a release sub-channel of the at least one channel. In one embodiment, the set of discrete number of channels of the communication links coupling the routing nodes and the core processors each include the data sub-channel, the acknowledgement sub-channel, and the release sub-channel for communication. The sub-channels can be electronic wires and/or optical channel waveguides connected to one or more routing nodes, processor cores and/or other components of the NoC.

In another embodiment, the method can include determining whether the set of discrete number of channels is in an idle state in order to communicate the data packets through the data sub-channel. The channels, for example, can be in an idle state, a partially reserved state, and/or a busy state, as discussed above. The states of the set of discrete number of channels of the communication link are all changed by a corresponding control unit of the bufferless crossbar switch. If all channels are busy, the data packets are dropped. Given that the NoC is nonblocking, this could happen because the destination processor is busy.

The data sub-channel, the acknowledgement sub-channel, and the release sub-channel of the set of discrete number of channels can be separate and distinct from one another within each channel of one or more communication links. The acknowledgement sub-channel is configured to communicate in a first direction, and the data sub-channel and the release sub-channel are configured to communicate in a second direction that is opposite to the first direction. Each channel, for example, can be a unidirectional bus or communication line that connects a node and/or a processor as a part of or the entire communication pathway on a chip.

In another embodiment, the set of non-blocking processes that determine the discrete number of channels in the communication links comprises determining a linear function that includes a total link capacity as a sum of a capacities and communication link lengths for each of the routing nodes based on a set of specifications. The set of specifications for example can comprise: a. an ingress constraint and an egress constraint setting that is for a set of traffic matrices of the routing nodes to satisfy; b. a value (e.g., a percentage) of an amount of traffic in the communication link communicatively coupling a first routing node to a second routing node to one (e.g., equal to one), in response to traffic passing through the communication link and to zero if traffic cannot pass through the communication link; and/or c. setting row and column sums of the set of traffic matrices to one.

Example processes for computing the number of channels of each link for making the network of the NoC nonblocking are described below. The communication link capacities are discrete and the number of channels in each link is an integer.

The overall power and silicon area consumed by the proposed NoC can be dominated by the total link capacities. Under this condition, both parameters can be expressed as a linear function as follows:

$$\text{Cost} = \omega \sum_{e \in E} c_e d_e,$$

where $\omega$ is the wire pitch, $c_e$ is the capacity of link e, and $d_e$ the length of link e. Since $\omega$ is fixed for a given fabrication technology, it can be dropped from the formulation.

Let V be the set of switching nodes (or routers) and E the set of links in a NoC. Let Q, where $Q \subseteq V$, be the set of edge nodes that are attached to processors. The remaining nodes are for data routing only. Let $|Q|=N$. This means that there are N network processor cores in the NoC. The condition $N=|V|$ usually holds for most topologies used by NoCs, with multi-level trees being as an exception.

Let $(\alpha_i, \beta_i)$ be the amounts of traffic that is allowed to enter and depart from the network at node i respectively. Let $t_{ij}$ represents the amount of traffic from node i to node j. $(\alpha_i, \beta_i)$ represent the row and column sum of the traffic matrix $\{t_{ij}\}$. Let $\Omega$ be the set of traffic matrixes that satisfy the ingress and egress constraint (ingress constrain and egress constraint for traffic matrices) of each node. That is, the set of $\{t_{ij}\}$ such that $$\Sigma_j t_{ij} \leq \alpha_i \quad (1a)$$

$$\Sigma_j t_{ji} \leq \beta_i. \quad (1b)$$

A nonblocking network is defined as a network where a flow will never be blocked inside the network as long as the ingress and the egress node of the flow have capacities to accommodate the flow.

The link-cost-minimization problem of a buffered nonblocking NoC can then be formulated as a LP (linear programming) problem.

$$\min \sum_{e \in E} d_e c_e \quad (2a)$$

$$\text{s.t.} \sum_{e \in \Gamma^+(v)} x_{ij}^e - \sum_{e \in \Gamma^-(v)} x_{ij}^e = 0$$

$$i, j \in Q, v \neq i, j$$

$$\sum_{e \in \Gamma^+(v)} x_{ij}^e - \sum_{e \in \Gamma^-(v)} x_{ij}^e = 1 \quad (2b)$$

$$i, j \in Q, , v = i$$

$$\sum_{e \in \Gamma^+(v)} x_{ij}^e - \sum_{e \in \Gamma^-(v)} x_{ij}^e = -1 \quad (2c)$$

$$i, j \in Q, v = j$$

$$\sum_{i,j} t_{ij} \cdot x_{ij}^e \leq c_e, \quad (2d)$$

$$\forall \{t_{ij}\} \in \Omega, \forall e \in E$$

$$\sum_{e \in \Gamma^+(v)} c_e + \sum_{e \in \Gamma^-(v)} c_e \leq C \quad (2e)$$

$$x_{ij}^e \in \{0, 1\}, c_e \geq 0, \quad (2f)$$

where $x_{ij}^e$ represents the percentage of $t_{ij}$ that is routed through link e. Constraint (2e) limits the total node capacity of each node to a given value C. The condition $\{t_{ij}\} \in \Omega$ means that $\{t_{ij}\}$ is subject to the same constraint as given in equations (1). That is:

$$\Sigma_j t_{ij} \leq \alpha_i$$

$$\Sigma_j t_{ji} \leq \beta_i$$

If a network is designed based on these equations above, it will be congestion free as long as the amount of traffic injected into or accepted from the network conform to the $(\alpha_i, \beta_i)$ specification.

Equation 2d means that the traffic can go to any destination on the network without causing overflow inside the network. This guarantees the nonblocking property of the network. However, Equation 2d lists all $\{t_{ij}\}$ that satisfy Equations 1a & 1b. Since there are an infinite number of them $\{t_{ij}\}$, the formulation is obviously intractable. The problem can be solved with a duality technique, which enables the processes to replace (2d) with the following two equations:

$$\sum_{i \in Q} \alpha_i \cdot \pi_e(i) + \sum_{j \in Q} \beta_j \cdot \lambda_e(j) \leq c_e, \quad (3c)$$

$$e \in E, T \in D$$

$$x_{ij}^e \leq \pi_e(i) + \lambda_e(j) \quad (3d)$$

$$i, j \in Q, e \in E,$$

where $\pi_e(i)$ and $\lambda_e(j)$ are auxiliary variables introduced in the duality transformation of the following LP formulation:

$$\max \Sigma_{i,j} t_{ij} x_{ij}^e$$

$$\text{s.t.} \Sigma_j t_{ij} \leq \alpha_i \; i, j \in Q$$

$$\Sigma_j t_{ji} \leq \beta_i \; i, j \in Q$$

With this substitution, (2) and (3) can be transformed as a linear programming problem (i.e., based on a linear function of routing node capacities).

The above formulation is for a buffered network. The processes can be modified to make the NoC a nonblocking bufferless network. This is done by setting $\alpha_i$ and $\beta_i$ to 1 and by setting $x_{ij}^e \in \{0,1\}$. If traffic $t_{ij}$ passes through link e, then $x_{ij}^e = 1$; otherwise, $x_{ij}^e = 0$. Once $x_{ij}^e$ is determined, the unique path from node i to node j is determined. As a result, the computed link capacity $c_e$ is guaranteed to be discrete. By setting the condition $x_{ij}^e \in \{0,1\}$, the problem becomes a mixed integer programming problem. One example produced by this formula for a 3×3 mesh network as described with reference to the illustrations above. The result is that some links are removed, and some links' capacities have increased.

Figure 9:
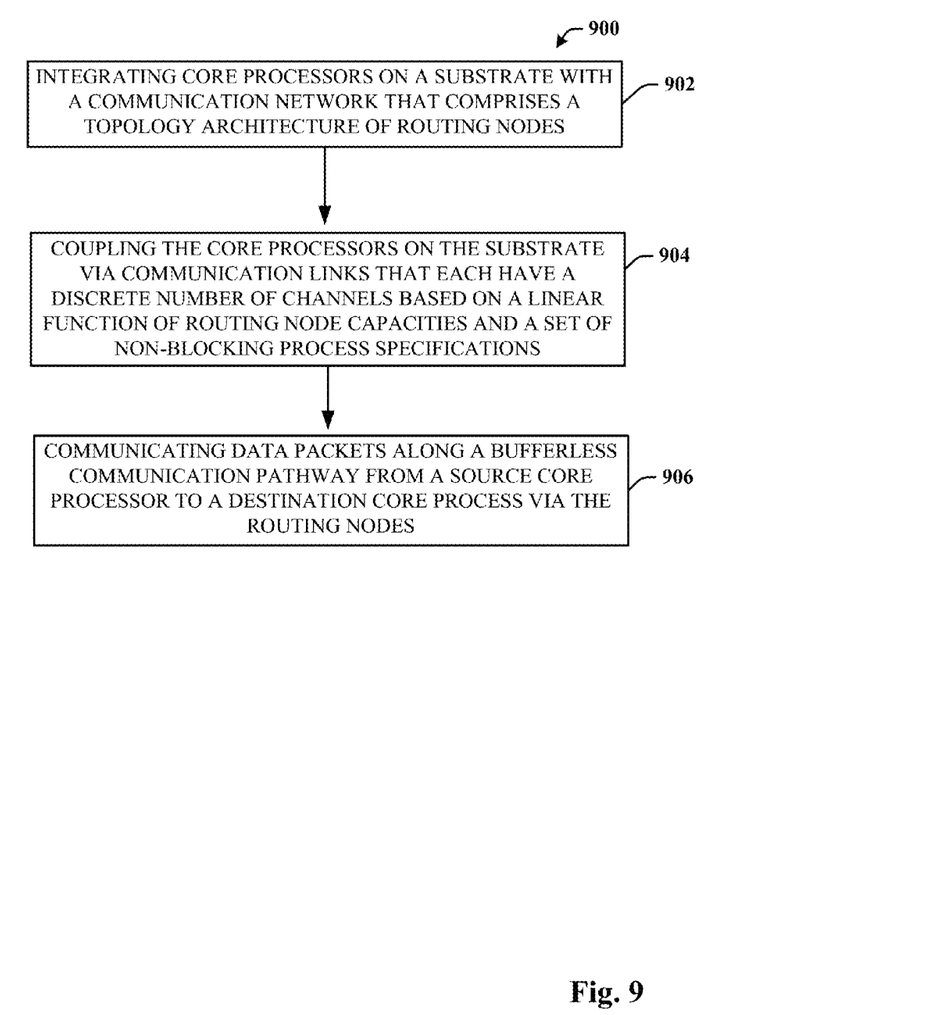
FIG. 9 illustrates an example methodology for a network on chip in accordance with certain embodiments of this disclosure.

Method 900 illustrates another exemplary process flow in accordance with various embodiments disclosed herein.

At 902, the core processors are communicatively coupled on the substrate via communication links that each have a discrete number of channels based on a linear function of routing node capacities and a set of non-blocking process specifications. The core processors are integrated on the substrate with a communication network that comprises a topology architecture of the routing nodes.

At 904, data packets are communicated along a bufferless communication pathway from a source core processor to a destination core process via the routing nodes.

In one embodiment, the set of non-blocking specifications can include at least one of: (a) an ingress constraint and an egress constraint for a set of traffic matrices of the routing nodes to satisfy; (b) a percentage of an amount of traffic in the communication link communicatively coupling a first routing node to a second routing node (it is set to one if traffic passes through the communication link and to zero if traffic cannot pass through the communication link), or (c) row and column sums of the set of traffic matrices equal one.

Before data transmission of the data packets initiates, a communication pathway from the source core processor to the destination core processor via the routing nodes is predetermined. Cross-points of a bufferless crossbar switch are locked to prevent the communication pathway from being affected by other data packets within at least one discrete channel of the discrete number of channels. Further, state information (e.g., idle, partially reserved, busy) of the locked cross-points can be reset in response to receiving a release signal at a release sub-channel of the at least one discrete channel.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media. Computer-readable storage media can be any available storage media that can be accessed by the computer, is typically of a non-transitory nature, and can include both volatile and non-volatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium; or a combination thereof, in which the computer readable medium can be a computer readable storage medium that is non-transitory and tangible.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be affected across a plurality of devices. Accordingly, the invention is not to be limited to any single embodiment, but rather can be construed in breadth, spirit and scope in accordance with the appended claims.

What is claimed is:

1. A system, comprising:
   core processors that are communicatively coupled together at a substrate via routing nodes based on a set of non-blocking processes;
   a network component configured to route data packets through the routing nodes and the core processors via communication links, wherein the data packets comprise information relating to a path of communication links for a routing of the data packets;
   a bufferless crossbar switch configured to facilitate communication of the data packets via the communication links;
   wherein a communication link of the communication links comprises a set of channels that include a data sub-channel configured to communicate the data packets, an acknowledgement sub-channel configured to communicate an acknowledgement message, and a release sub-channel configured to communicate a release message, and
   wherein the network component is further configured to route the data packets to an intended destination, absent network blocking, via a pathway of the set of channels and a set of sub-channels comprising at least a sub-channel based on information stored in a head flit of the data packets, wherein the information specifies the pathway based on at least one idle channel being determined to correspond to an outgoing link.

2. The system of claim 1, wherein the acknowledgement sub-channel is further configured to communicate an ACK signal via the acknowledgment sub-channel and in a first direction, wherein the release sub-channel is further configured to set the data sub-channel to an idle state by communicating a RELEASE signal, via the release sub-channel, and wherein the data sub-channel and the release sub-channel are further configured to communicate data packets and the RELEASE signal respectively in a second direction of communication that is opposite to the first direction.

3. The system of claim 1, wherein the bufferless crossbar switch includes a cross bar data unit and a control unit respectively, and wherein the control unit is configured to decide if a channel of the outgoing link is in an idle state to communicate a data packet of the data packets through the data sub-channel, or to drop the data packet in response to the determination indicating that none of the set of channels of the outgoing link are in the idle state.

4. The system of claim 3, wherein the control unit is further configured to change the idle state of the channel to a partially reserved state after the control unit facilitates a communication of the data packet through the data sub-channel of a selected channel, change the idle state to a busy state in response to the acknowledgement message being received within a time-out interval, and reset the set of channels to the idle state after the release message is received from the release sub-channel, and wherein, in response to the acknowledgement message not being received within the time-out interval, the control unit is further configured to reset the partially reserved state of the selected channel to the idle state.

5. The system of claim 1, wherein the data sub-channel comprises an optical data sub-channel configured to communicate a path setup packet to at least one routing node or at least one processor, and the acknowledgement sub-channel and the release sub-channel include respective electronic connections.

6. The system of claim 1, wherein the crossbar switch includes at least one optical ring configured to couple at least one of a processor of the core processors or a routing node of the routing nodes to at least one of another processor of the core processors or another routing node of the routing nodes via the data sub-channel.

7. The system of claim 1, wherein each of the communication links includes a discrete number of channels, wherein the discrete number is an integer that is determined based at least on the pathway by which the data packets travel.

8. The system of claim 7, wherein a topology of the system includes a multi-slice architecture having at least two different configurations of the routing nodes and the core processors integrated at the substrate.

9. A method, comprising:
   determining, for a given topology of a network, a number of channels in a communication link of a set of communication links of a bufferless routing node of the network such that the network is nonblocking;
   routing data packets with a bufferless crossbar of routing nodes of the network including the bufferless routing node; and
   directing the data packets to an intended destination processor, absent network blocking, based on a number of travel paths available in connection with the number of channels that are idle at a given time and the set of communication links;
   wherein the communication link comprise a data sub-channel configured to communicate the data packets, an acknowledgement sub-channel configured to communicate an acknowledgement message, and a release sub-channel configured to communicate a release message, and
   wherein the directing the data packets to the intended destination processor, absent network blocking, occurs via a pathway of the set of channels and a set of sub-channels comprising at least a sub-channel based on information stored in a head flit of the data packets, wherein the information specifies the pathway based on at least one idle channel being determined to correspond to an outgoing link.

10. The method of claim 9, further comprising:
    communicating the data packets via the data sub-channel;
    communicating the acknowledgement message via the acknowledgement sub-channel; and
    communicating the release message via the release sub-channel.

11. The method of claim 10, further comprising:
    determining whether a channel of the number of channels is in an idle state;
    dropping the data packets in response to the determining indicating that none of the channels of the communication link are in the idle state; and
    changing a state of the channels via a control unit of the bufferless cross bar switch.

12. The method of claim 10, wherein the data sub-channel, the acknowledgement sub-channel, and the release sub-channel are separate and distinct pathways by which data or a release signal travels in a first direction and an ACK signal travels in a second direction that is opposite of the first direction.

13. The method of claim 9, further comprising:
   determining, before data transmission of the data packets initiates, a communication pathway from a source core processor to a destination core processor via the routing nodes;
   changing an idle state of at least one channel of the number of channels to a partially reserved state after a path setup packet is transmitted through the at least one channel;
   changing the idle state to a busy state in response to an acknowledgement message being received by the routing nodes within a time-out interval; and
   resetting the at least one channel to the idle state after the release message is received by the release sub-channel, wherein, in response to the acknowledgement message not being received within the time-out interval, the partially reserved state of the at least one channel is reset to the idle state.

14. A method, comprising:
   initiating coupling of core processors on a substrate via routing nodes based on a set of nonblocking processes;
   routing data packets through the routing nodes and the core processors via communication links, wherein the data packets comprise information relating to a path of communication links for a routing of the data packets;
   facilitating, by a bufferless cross-bar switch, communication of the data packets via the communication links, wherein a communication link of the communication links includes a set of channels that include a data sub-channel configured to communicate the data packets, an acknowledgement sub-channel configured to communicate an acknowledgement message, and a release sub-channel configured to communicate a release message; and
   routing the data packets to an intended destination, absent network blocking, via a pathway of the set of channels and a set of sub-channels including at least the sub-channel based on information stored in a head flit of the data packets, wherein the information specifies the pathway based on at least one idle channel being determined to correspond to an outgoing link.

15. The method of claim 14, wherein the set of nonblocking processes include at least one of:
   an ingress constraint and an egress constraint for a set of traffic matrices of the routing nodes to satisfy,
   a percentage of traffic in a communication link communicatively coupling a first routing node to a second routing node set to one hundred percent in response to traffic passing through the communication link and set to zero percent in response to traffic being unable to pass through the communication link, or row and column sums of the set of traffic matrices equal one.

16. The method of claim 14, further comprising:
   determining whether the set of channels are in an idle state to communicate the data packets through the data sub-channel;
   dropping the data packets in response to the determining indicating that none of the set of channels are in the idle state; and
   changing states of the set of channels based on the determining.

17. The method of claim 16, further comprising:
   resetting state information in response to receiving a release signal at the release sub-channel.

18. The method of claim 16, wherein the set of channels are changed from the idle state to a non-idle state based on the determining indicating that the set of channels are not in the idle state.

19. The method of claim 15, wherein the set of nonblocking processes include a specification that determines a number of channels corresponding to the communication link.

20. The method of claim 17, wherein the state information is reset to either the idle state, a partially reserved state, or a busy state in response to the receiving the data packet, ack signal, or release signal.

* * * * *